United States Patent
Noguchi et al.

[15] 3,650,899
[45] Mar. 21, 1972

[54] PROCESS FOR PRODUCING L-PROLINE

[72] Inventors: Yuichi Noguchi; Toru Nakanishi; Yasuyuki Taketugu, all of Hofu-shi, Japan

[73] Assignee: Kyowa Hakko Kogyo Co., Ltd., Tokyo, Japan

[22] Filed: June 14, 1968

[21] Appl. No.: 736,957

Related U.S. Application Data

[63] Continuation of Ser. No. 696,493, Jan. 9, 1968, abandoned.

[30] Foreign Application Priority Data

Jan. 13, 1967 Japan..................................42/2180

[52] U.S. Cl. .....................................195/29, 195/30, 195/47
[51] Int. Cl. .........................................................C12d 1/02
[58] Field of Search..............................195/29, 49, 28, 30, 47

[56] References Cited

UNITED STATES PATENTS 3,216,906  11/1965  Kinoshita et al. .....................195/47 X
3,285,827  11/1966  Arzberger et al. .....................195/47 X
3,329,577  7/1967   Okumura et al. ........................195/29

OTHER PUBLICATIONS

Kyowa Fermentation Industry Co., Chem. Abs. " Proline," Vol. 67, No. 89807 X, 1967

Primary Examiner—A. Louis Monacell
Assistant Examiner—Gary M. Nath
Attorney—Craig, Antonelli, Stewart & Hill

[57] ABSTRACT

A process for producing L-proline by fermentation which comprises culturing a micro-organism capable of producing L-proline under aerobic conditions in an aqueous nutrient medium containing biotin, in an amount at least sufficient for the growth of the bacterial cells, and at least 0.5 mole per liter each of ammonium ion and chloride ion. A convenient supply of the said ions is ammonium chloride. Preferred micro-organism are Micrococcus glutamicus ATCC 21157, 21158 and 21159.

13 Claims, No Drawings

PROCESS FOR PRODUCING L-PROLINE

CROSS-REFERENCE TO RELATED APPLICATION

This application is a continuation of copending application Ser. No. 696,493, filed on Jan. 9, 1968, now abandoned.

This invention relates to a process for producing L-proline. More particularly, it relates to a process for the production of L-proline by fermentation. Even more particularly, the invention relates to a process for the production of L-proline by fermentation by converting an L-glutamic acid fermentation into an L-proline fermentation.

In the production of L-proline by the use of micro-organisms, since Vogel et al. found that L-proline was produced from glutamic acid by using a mutant of *Escherichia coli*, a similar relationship has been recognized by using *Neurospora sitophila*, yeasts and the like. Furthermore, a few studies on the mechanism of the production in an enzymatic level have been reported. However, with respect to the direct production of L-proline from carbon sources such as carbohydrates by fermentation, the only report that has been found in the literature states that about 1.2 g./dl. of L-proline is accumulated in the culture medium by the use of the mutant strain *Brevibacterium flavum* 2,247 No. 14–5 ATCC 15940, this strain having the property of requiring isoleucine for its growth.

Unfortunately, the prior art processes do not allow for an efficient industrial scale production of L-proline, which is a well-known amino acid.

Accordingly, one of the objects of the present invention is to provide an improved process for the production of L-proline which overcomes the disadvantages and deficiencies of the prior art methods.

Another object of the present invention is to provide a process for producing L-proline by fermentation which may be carried out in an efficacious and simple manner.

A further object of the invention is to provide a process for producing L-proline by fermentation which may be carried out advantageously on an industrial scale at low cost to give a high yield of product.

These and other objects and advantages of the present invention will become apparent to those skilled in the art from a consideration of the following specification and claims.

As the result of examinations on the L-proline-producing ability of a large number of L-glutamic acid-producing micro-organisms, having noted that L-proline is sometimes produced as a subsidiary product in the fermentation liquor after the completion of the fermentation, the present inventors have found that micro-organisms having the capability of producing L-proline are more widely distributed than was expected. In fact, almost all of the L-glutamic acid-producing micro-organisms possess a productivity for L-proline. Accordingly, research has been carried out with the object of obtaining a reproducible process for accumulating large amounts of L-proline by fermentation by converting the L-glutamic acid fermentation into an L-proline fermentation. Thus, under the appropriate culturing conditions, L-proline can be obtained by the use of L-glutamic acid-producing micro-organisms.

Thus, in accordance with the present invention, significant amounts of L-proline are accumulated and may be recovered from the culture liquor when culturing is carried out under the conditions that a sufficient or an excess amount of biotin is added to the medium for the growth and propagation of the bacterial cells and the medium contains 0.5 mole per liter or more of ammonium ion and chloride ion, respectively. Culturing micro-organisms having the capability of producing L-proline under these conditions in a culture medium containing appropriate carbon sources, nitrogen sources, inorganic substances or other appropriate nutrients results in a large productivity of L-proline.

Specifically, one of the culturing conditions known in the art for using L-glutamic acid producing micro-organisms in an L-glutamic acid fermentation is that it is required to adjust the concentration of carbon source and nitrogen source in order to keep the ratio of carbon to nitrogen at about 100:5 or more in the culture medium. As the nitrogen source, the use of various kinds of ammonium salts is well known and these are generally employed.

With regard to the optimum concentration of biotin for the production of L-glutamic acid, it has been thought that cultivation should be conducted under the condition that biotin concentration should be kept at a level which is lower than that necessary for maximizing the growth of the bacterial cells. From this point of view, it has been regarded that L-glutamic acid will accumulate in the medium with this limitation on the biotin concentration even if the concentration of ammonium salt or the ratio thereof is kept at any high level. However, in practice, the amount of L-glutamic acid produced is significantly lowered with an increase in the concentration of ammonium salt. Theoretically, a question is probably raised as to the role of the ammonium ion and the anion contained in the ammonium salt as a reason why the production of L-glutamic acid is inhibited when a high concentration of ammonium salt is employed. As the result of further investigations on this problem, the phenomenon of various fermentation conversions has been seen, one after another, depending upon the kind of anion and the concentration thereof present, despite the concentration of ammonium ion. In culturing the aforementioned micro-organisms, i.e., those having the capability of producing L-proline, it has been recognized that the production of L-proline is significantly accelerated by keeping the concentration of ammonium salt to about 4% by weight or more, especially in the case when using ammonium chloride as the ammonium salt in the culture medium. Furthermore, it has also been found that a culture medium containing ammonium chloride in high concentration is effective for the production of L-proline because of the synergistic action of the ammonium ion concentration and the chloride ion concentration.

In addition, the productivity of L-proline in the culture medium having a high concentration of both ions tends to be accelerated with an increasing biotin concentration, this being in contrast to the optimum biotin concentration utilized when producing L-glutamic acid by fermentation. The amount of L-proline produced becomes maximum when a sufficient amount or an excess amount of biotin for the growth of the bacterial cells is added to the culture medium.

In order to help clarify these points, the effects of the concentration of ammonium ion and chloride ion as well as the concentration of biotin on the production of L-proline are shown in the following tables.

TABLE 1

| (NH$_4$)$_2$SO$_4$, NH$_4^+$ g./dl. (mole/l.) | NaCl, g./dl. (Cl$^-$, mole/l.) | | | | | | |
|---|---|---|---|---|---|---|---|
| | 0 (0) | 1.23 (0.187) | 2.46 (0.374) | 3.69 (0.561) | 4.92 (0.748) | 6.15 (0.935) | 7.38 (1.122) |
| 1.26 (0.187) | 3.2 | 4.8 | 6.3 | 10.4 | 12.2 | 15.3 | 13.2 |
| 2.52 (0.374) | 5.7 | 9.4 | 11.9 | 15.6 | 17.4 | 19.0 | 14.8 |
| 3.78 (0.561) | 7.2 | 11.8 | 18.2 | 24.4 | 28.3 | 27.0 | 19.1 |
| 5.04 (0.748) | 9.4 | 13.8 | 21.4 | 27.0 | 32.4 | 30.0 | 24.6 |
| 6.30 (0.935) | 10.1 | 16.7 | 25.4 | 29.5 | 30.4 | 21.4 | 16.6 |
| 7.46 (1.122) | 10.2 | 15.3 | 21.8 | 20.6 | 17.6 | 13.7 | 10.4 |

Note 1)
Composition of fermentation medium:

| | |
|---|---|
| Glucose | 18 g./dl. |
| (NH$_4$)$_2$SO$_4$ | same as shown in table |
| NaCl | same as shown in table |
| KH$_2$PO$_4$ | 0.10 g./dl. |
| K$_2$HPO$_4$ | 0.10 g./dl. |

| | |
|---|---|
| $MgSO_4 \cdot 7H_2O$ | 0.05 g./dl. |
| $FeSO_4 \cdot 7H_2O$ | 0.002 g./dl. |
| $MNSO_4 \cdot 4H_2O$ | 0.002 g./dl. |
| $ZnSO_4 \cdot 7H_2O$ | 0.001 g./dl. |
| $NiCl_2 \cdot 6H_2O$ | 0.001 g./dl. |
| $K_2CrO_4$ | 0.001 g./dl. |
| biotin | 100 γ/l. |
| thiamine hydrochloride | 2 mg./l. |
| meat extract | 0.5 g./dl. |
| urea | 0.5 g./dl. |
| $CaCO_3$ | 5.0 g./dl. |

Note 2)

Culturing conditions:

20 ml. of the culture medium was poured into a Sakaguchi flask and sterilized. The strain *Micrococcus glutamicus* M-560-12 ATCC 21157 was inoculated therein and cultured under aerobic conditions with shaking at 28°–30° C. for 96 hours.

0.7–1.2 mole per liter. However, as is clear from the comparison of Table 1 with Table 2, when ammonium chloride is added as ammonium and chloride ion sources, the optimum amount can reach a considerably higher concentration than when two compounds such as ammonium chloride and sodium chloride are added, and the amount of L-proline produced can be increased. These phenomena seem to be due to the fact that in case of ammonium chloride the osmotic pressure in the medium is not so highly elevated that the growth inhibiting action thereof upon the micro-organism is low, and the unnecessary inhibiting action of other ions such as Na and $SO_4$ ions never takes place. Furthermore, the effect of both ions on the production of L-proline is closely related to the concentration of biotin in the culture medium. The biotin concentration which is optimum for the production of L-proline is about 3–5

TABLE 2

| | | Concentration of ammonium chloride ($NH_4Cl$, mole/l.) | | | | | | | | | | | |
|---|---|---|---|---|---|---|---|---|---|---|---|---|---|
| | | 2.0 (0.374) | | | 4.0 (0.748) | | | 6.0 (1.121) | | | 10.0 (1.870) | | |
| Sugar concentration, g./dl. | Biotin concentration, γ/l. | Amount of L-proline produced, mg./ml. | Amount of L-glutamic acid produced mg./ml. | Amount of bacterial cells, mg./dl. | Amount of L-proline produced, mg./ml. | Amount of L-glutamic acid produced, mg./ml. | Amount of bacterial cells, mg./ml. | Amount of L-proline produced, mg./ml. | Amount of L-glutamic acid produced, mg./ml. | Amount of bacterial cells, mg./bl. | Amount of L-proline produced, mg./ml. | Amount of L-glutamic acid produced, mg./ml. | Amount of bacterial cells, mg./dl. |
| 15 | 5 | 2.6 | 23.4 | 13.0 | 5.1 | 20.5 | 10.1 | 8.9 | 8.0 | 10.0 | 3.2 | 0.3 | 6.2 |
| | 10 | 6.3 | 30.2 | 16.2 | 9.9 | 23.2 | 16.4 | 13.2 | 7.5 | 15.6 | 7.6 | 0.6 | 8.1 |
| | 15 | 8.1 | 19.4 | 29.2 | 14.4 | 20.2 | 21.8 | 18.1 | 17.4 | 18.4 | 13.2 | 1.2 | 10.2 |
| | 20 | 12.6 | 3.6 | 31.4 | 18.1 | 5.8 | 27.6 | 21.5 | 7.4 | 22.2 | 15.6 | 1.8 | 12.4 |
| | 30 | 12.5 | 1.0 | 32.2 | 18.8 | 4.6 | 31.2 | 26.5 | 3.2 | 25.8 | 17.8 | 1.5 | 14.8 |
| | 50 | 12.2 | 0.9 | 32.4 | 19.2 | 3.2 | 32.3 | 27.1 | 2.8 | 26.2 | 19.6 | 0.9 | 17.1 |
| | 100 | 12.2 | 0.9 | 32.8 | 19.5 | 2.6 | 32.8 | 27.2 | 2.1 | 26.4 | 21.2 | 0.3 | 18.6 |
| | 1,000 | 12.1 | 0.8 | 31.8 | 19.0 | 2.4 | 31.4 | 27.3 | 1.9 | 26.2 | 23.5 | 0.1 | 19.2 |
| 20 | 5 | 1.8 | 15.3 | 11.2 | 3.2 | 3.6 | 9.2 | 2.7 | 1.8 | 8.8 | 1.3 | 0.1 | 3.4 |
| | 10 | 7.1 | 17.2 | 16.2 | 8.8 | 9.2 | 13.6 | 9.1 | 2.4 | 11.8 | 3.6 | 0.3 | 7.2 |
| | 15 | 9.8 | 19.4 | 22.4 | 17.3 | 9.4 | 19.4 | 19.7 | 5.0 | 15.8 | 7.9 | 0.7 | 8.5 |
| | 20 | 15.8 | 11.0 | 29.2 | 22.6 | 15.4 | 21.2 | 26.5 | 3.3 | 17.8 | 13.2 | 1.2 | 9.1 |
| | 30 | 16.8 | 2.8 | 31.4 | 25.4 | 4.2 | 23.0 | 35.0 | 3.9 | 19.8 | 15.4 | 1.7 | 11.2 |
| | 50 | 17.1 | 2.5 | 32.0 | 26.2 | 3.8 | 25.0 | 36.4 | 2.9 | 21.2 | 17.6 | 1.4 | 14.1 |
| | 100 | 17.2 | 2.3 | 31.4 | 26.1 | 3.6 | 26.4 | 37.2 | 2.7 | 21.6 | 20.2 | 0.9 | 15.2 |
| | 1,000 | 17.2 | 2.1 | 31.2 | 25.8 | 3.4 | 26.2 | 36.5 | 2.5 | 21.8 | 22.8 | 0.6 | 16.4 |

Note 1)

Composition of fermentation medium:

| | |
|---|---|
| Glucose | Same as shown in table |
| $NH_4Cl$ | Same as shown in table |
| $K_2HPO_4$ | 0.10 g./dl. |
| $KH_2PO_4$ | 0.10 g./dl. |
| $MgSO_4 \cdot 7H_2O$ | 0.05 g./dl. |
| $FeSO_4 \cdot 7H_2O$ | 0.002 g./dl. |
| $MnSO_4 \cdot 4H_2O$ | 0.002 g./dl. |
| $ZnSO_4 \cdot 7H_2O$ | 0.001 g./dl. |
| $NiCl_2 \cdot 6H_2O$ | 0.001 g./dl. |
| $K_2CrO_4$ | 0.001 g./dl. |
| biotin | Same as shown in table |
| thiamine hydrochloride | 2 mg./l. |
| meat extract | 0.5 g./dl. |
| urea | 0.5 g./dl. |
| $CaCO_3$ | 5.0 g./dl. |

Note 2)

Culturing conditions:

Same as shown in Table 1.

Note 3)

The amounts of bacterial cells are shown by weight of dried bacterial cells.

Thus, the relationship between the ammonium chloride concentration and the biotin concentration is shown in Table 1 and Table 2 by using ammonium sulfate as the ammonium ion source, sodium chloride as the chloride ion source and ammonium chloride as the source of both ammonium and chloride ions, respectively. As can be seen from these Tables, the amount of L-proline produced is increased to some extent by increasing the concentration of ammonium ion in the culture medium. Moreover, the production of L-proline is significantly accelerated by increasing the chloride ion concentration by the addition of sodium chloride. When the concentration of both ions is about 0.5 mole per liter or more, this tendency becomes more significant and the amount of L-proline produced reaches a maximum with a concentration of about times or more over that which is optimum for the production of L-glutamic acid with the micro-organisms employed. It is clear that the production of L-proline shows a maximum when an amount of biotin sufficient or in excess of the amount necessary for the growth of the bacterial cells is present in the culture medium.

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts. Thus, the various well known raw materials which are utilized for the conventional cultivation of L-glutamic acid-producing micro-organisms, except with respect to the ammonium ion concentration, the chloride ion concentration and the biotin concentration as discussed above, are employed. As a carbon source, there may be mentioned, by way of example, carbohydrates such as glucose, fructose, maltose, sucrose, starch, starch hydrolysate, molasses, etc., or any other suitable carbon source such as glycerol, mannitol, sorbitol, aliphatic organic acids such as gluconic acid, citric acid, acetic acid, and the like, etc. These substances may be used either as a single source of carbon or in mixtures of two or more. As a nitrogen source, various kinds of inorganic or organic salts or compounds, such as urea, ammonia, or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, fish solubles, rice bran extract, etc. may be employed. These substances may also be used either singly or in combinations of two or more. Inorganic compounds which may be added to the medium include magnesium sulfate, sodium phosphate, potassium dihydrogen phosphate, potassium monohydrogen phosphate, iron sulfate, manganese chloride, calcium chloride, sodium chloride or other salts of potassium, magnesium, iron, manganese and the like. In addition, various nutrients such as vitamins, amino acids, nucleic acids and the like can be added to the medium.

The components to be employed in the culture medium during fermentation, as mentioned above, are added and the aforementioned inorganic and organic nitrogen compounds are added to the culture medium in order that the medium contains 0.5 mole or more of ammonium ion. As the chloride ion to be added to the medium, for example, chlorides such as sodium chloride, potassium chloride, calcium chloride, etc. may be used. The use of ammonium chloride which contains both ions is the most economical and effective expedient.

The optimum concentration of biotin to be used in the fermentation process of the present invention for producing L-proline varies somewhat with the composition of the culture medium, the culturing conditions and the like. Consequently, the concentration of biotin to be added to the culture medium correspondingly varies with these conditions. In general, the addition of about 30–1,000 $\gamma/l$ is preferred. Commercially available pure sources of biotin as well as crude products containing biotin are usable. In case that biotin-containing substances such as molasses are used in the medium, a portion or even all of the biotin required may be supplied thereby. Biotin substitutes may also be employed. Such substitutes which are operable with micro-organisms include, for example, biotin homologues such as biocitin, d,1-desthiobiotin, etc., pelargonic acid group substances such as 7-keto-8-amino pelargonic acid salts, 7,8-diketo pelargonic acid and the like, higher unsaturated fatty acids such as palmitic acid, linoleic acid, oleic acid and the like, and nonionic surface active agents such as Span 80 (a trade name for sorbitan mono-oleate), Tween 80 (a trade name for polyoxyethylene sorbitan mono-oleate), etc. Substances which are recognized as being the equivalents of biotin may, of course, be used therefor as desired. When using these substitutes, the amount to be added is determined by taking into consideration the substitution activity which is already known in the art.

The most appropriate and preferred strains to be employed in the present invention are *Micrococcus glutamicus* M-560-12, *Micrococcus glutamicus* MF-62 and *Micrococcus glutamicus* MF-57. These strains have been deposited with the American Type Culture Collection Rockville, Maryland, U.S.A. and have been cataloged as ATCC numbers 21,157, 21,159 and 21,158, respectively. However, it is to be understood that the present invention is not restricted to these particular micro-organisms, but is applicable to micro-organisms already known in the art as being capable of producing glutamic acid and which have the capability of producing L-proline.

Cultivation or fermentation is conducted under aerobic conditions, such as aerobic shaking of the culture or with aeration and agitation of a submerged culture, at a temperature of about 25°–35° C., preferably 28°–32° C., and at a pH of about 6.0–7.0. It is best to adjust the pH during culturing to within the described range. As neutralizing agents for this purpose, ammonia, urea, sodium hydroxide, potassium hydroxide, calcium carbonate and the like may be employed. L-proline is accumulated in the resultant culture liquor as a main product usually after 2–5 days of culturing.

After the completion of fermentation, the L-proline may be recovered from the fermentation liquor by an ion exchange resin treatment. For example, the cultured liquor is filtered, adsorbed by a cation exchange resin and then eluted. The effluent is substituted for methanol after concentration under reduced pressure to filter the mixed methanol-scarcely soluble amino acid. Then, it is substituted for water and passed through a cation exchange resin and an anion exchange resin to remove a small amount of the basic and acidic amino acid content. The effluent is substituted for methanol again to filter insoluble portions after concentration. Consequently, crude crystals of L-proline can be obtained by concentrating to dryness under reduced pressure.

The following examples are given merely as illustrative of the present invention and are not to be considered as limiting. Unless otherwise noted, the percentages therein and throughout the application are by weight.

EXAMPLE 1

A culture medium having the following composition is prepared in 1 liter of water:
 25 g./dl. glucose
 6 g./dl. $NH_4Cl$
 0.10 g./dl. $KH_2PO_4$
 0.15 g./dl. $K_2HPO_4$
 0.10 g./dl. $MgSO_4 \cdot 7H_2O$
 0.002 g./dl. $FeSO_4 \cdot 7H_2O$
 0.002 g./dl. $MnSO_4 \cdot 4H_2O$
 0.001 g./dl. $ZnSO_4 \cdot 7H_2O$
 2 mg./$l$ thiamine hydrochloride
 5.0 g./dl. $CaCO_3$
 0.5 g./dl. yeast extract
 0.5 g./dl. urea
 80 $\gamma$/dl. biotin Twenty ml. of the above culture medium is poured into a 500 ml. Sakaguchi flask and sterilized at 120° C. for 15 minutes. The phosphates and urea are each separately sterilized. To portions of the resultant culture medium contained in individual flasks is inoculated *Micrococcus glutamicus* MF-57 ATCC 21158. Culturing is then carried out with aerobic shaking at 30° C. for 96 hours.

The amount of L-proline produced in the cultured liquor after the completion of culturing is 22.4 mg./ml. on the average. The amount of L-glutamic acid subsidiarily produced is, on the average, 4.2 mg./ml.

The resultant culture liquor, after the completion of culturing, is collected and adjusted to a volume of 1 liter. The pH thereof is adjusted to 2 by adding sulfuric acid thereto, and insoluble substances are filtered off. The filtrate is passed through a sulfonic acid-type cation exchange resin and, after adsorption, it is eluted with ammonia water. 0.3 $l$ of the L-proline effluent fraction is concentrated under reduced pressure (to a volume of about 50 ml.). Then, methanol is continuously added thereto and at the same time the solution is concentrated, whereby the aqueous concentrated solution is replaced with the methanol solution. The methanol solution is filtered in order to remove amino acids which are only soluble in methanol as much as possible. The methanol solution is substituted for water again and passed through a cation exchange resin column and then an anion exchange resin column. After concentrating the effluent, substitution for methanol is again effected in order to remove insoluble substances. The resultant methanolic solution, comprising about 100 ml., is concentrated to dryness under reduced pressure. As a result, 16 grams of crude crystals of L-proline is obtained.

EXAMPLE 2

The following culture medium is prepared in one liter of water:
 20 g./dl. glucose
 5 g./dl. $(NH_4)_2SO_4$
 5 g./dl. NaCl
 0.10 g./dl. $KH_2PO_4$
 0.10 g./dl. $K_2HPO_4$
 0.05 g./dl. $MgSO_4 \cdot 7H_2O$
 0.002 g./dl. $MnSO_4 \cdot 4H_2O$
 0.001 g./dl. $ZnSO_4 \cdot 7H_2O$
 0.001 g./dl. $NiCl_2 \cdot 6H_2O$
 0.001 g./dl. $K_2CrO_4$
 1 mg./ml. thiamine hydrochloride
 4.0 g./dl. $CaCO_3$
 1.0 g./dl. yeast extract
 0.5 g./dl. urea
 50 $\gamma/l$ biotin Twenty ml. portions of the above culture medium are poured into 500 ml. conical flasks and sterilized at 120° C. for 15 minutes. The phosphates and urea are separately sterilized, respectively. To each of the flasks containing the culture medium is inoculated *Micrococcus glutamicus* M-560-12 ATCC 21157. Culturing is then carried out with aerobic shaking at 28° C. for 96 hours.

The amount of L-proline produced in the cultured liquor after the completion of culturing is 24.8 mg./ml. on the average. The amount of L-glutamic acid subsidiarily produced is 3.1 mg./ml. on the average.

After the completion of culturing, the cultured liquor is collected and adjusted to a volume of 1 liter. Recovery of the L-proline is carried out in the same manner as described in Example 1. As a result, about 18 grams of crude crystals of L-proline is obtained.

EXAMPLE 3

A fermentation medium having the following composition is prepared in one liter of water:
25 g./dl. glucose
5 g./dl. NH$_4$Cl
0.10 g./dl. KH$_2$PO$_4$
0.15 g./dl. K$_2$HPO$_4$
0.05 g./dl. MgSO$_4$·7H$_2$O
0.003 g./dl. MnSO$_4$·4H$_2$O
0.002 g./dl. ZnSO$_4$·7H$_2$O
2 mg./*l* thiamine hydrochloride
4.0 g./dl. CaCO$_3$
0.5 g./dl. yeast extract
0.5 g./dl. urea
100 $\gamma$/*l* biotin Three liters of the above culture medium is put into a 5 liter-jar fermentor and sterilized at 120° C. for 15 minutes. The phosphates and urea are each separately sterilized. The seed bacterium liquor of *Micrococcus glutamicus* MF-62 ATCC 21159 is inoculated into the culture medium. Culturing is then carried out with aeration and agitation of the submerged culture at a culturing temperature of 30° C. and with aeration in the amount of 3 liters per minute and with agitation at the rate of 650 r.p.m.

The amount of L-proline produced in the cultured liquor after the completion of culturing is 30.4 mg./ml., and the amount of L-glutamic acid produced subsidiarily is 3.8 mg./ml.

After the completion of culturing, the resultant culture liquor is treated in the same manner as described in Example 1. Consequently, about 70 grams of crude crystals of L-proline is obtained.

EXAMPLE 4

Culturing is carried out in the same manner as described in Example 1, except that the substances shown in Table 3 are substituted for the biotin which was employed in Example 1. The results are shown in Table 3.

TABLE 3

| Biotin substitutes | Concentration | Amount of L-proline produced (mg./ml.) | Amount of L-glutamic acid subsidiary produced (mg./ml.) |
|---|---|---|---|
| Biocitin | 200 $\gamma$/l. | 18.8 | 7.1 |
|  | (20 $\gamma$/l.) | (5.1) | (17.6) |
| d,1-desthiobiotin | 200 $\gamma$/l. | 16.9 | 4.2 |
|  | (20 $\gamma$/l.) | (3.6) | (14.4) |
| 7,8-diaminopelargonic acid | 2,000 $\gamma$/l. | 14.8 | 4.6 |
|  | (200 $\gamma$/l.) | (1.9) | (15.6) |
| Tween 80 | 20 mg./ml. | 20.8 | 2.0 |
|  | (2 mg./ml.) | (7.9) | (25.1) |
| Sodium laurate | 10 mg./ml. | 17.8 | 2.1 |
|  | (1 mg./ml.) | (3.2) | (21.4) |
| Calcium oleate | 10 mg./ml. | 22.8 | 3.2 |
|  | (1 mg./ml.) | (5.9) | (23.7) |

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing L-proline by fermentation which comprises culturing a micro-organism capable of producing L-proline under aerobic conditions in an aqueous nutrient medium containing biotin, in an amount at least sufficient for the growth of the bacterial cells, and at least 0.5 mole per liter each of ammonium ion and chloride ion, accumulating L-proline in the resultant culture liquor and isolating the same therefrom.

2. The process of claim 1, wherein said nutrient medium contains ammonium chloride as the source of ammonium and chloride ion.

3. The process of claim 1, wherein the concentration of ammonium and of chloride ion in the medium is about 0.7 to 1.2 mole per liter each.

4. The process of claim 1, wherein the concentration of biotin in the medium is about 30 to 1,000 micrograms per liter.

5. The process of claim 1, wherein a sufficient quantity of a biotin substitute selected from the group consisting of biocitin, d,1-desthiobiotin, pelargonic acid compounds, higher unsaturated fatty acids and nonionic surface active agents is employed in said medium as at least a partial replacement for the biotin.

6. The process of claim 1, wherein said nutrient medium contains at least 5 grams per deciliter of ammonium chloride.

7. A process for producing L-proline by fermentation which comprises culturing a micro-organism selected from the group consisting of *Micrococcus glutamicus* ATCC 21157, *Micrococcus glutamicus* ATCC 21158 and *Micrococcus glutamicus* ATCC 21159 under aerobic conditions in an aqueous nutrient medium containing biotin, in an amount at least sufficient for the growth of the bacterial cells, and at least 0.5 mole per liter each of ammonium ion and chloride ion, accumulating L-proline in the resultant culture liquor and isolating the same therefrom.

8. The process of claim 7, wherein said nutrient medium contains ammonium chloride as the source of ammonium and chloride ion.

9. The process of claim 7, wherein culturing is carried out at a temperature of about 25°–35° C. and at a pH of about 6.0–7.0.

10. The process of claim 7, wherein the concentration of ammonium and of chloride ion in the medium is about 0.7–1.2 mole per liter each.

11. The process of claim 7, wherein the concentration of biotin in the medium is about 30–1,000 micrograms per liter.

12. The process of claim 7, wherein a sufficient quantity of a biotin substitute selected from the group consisting of biocitin, d,1-desthiobiotin, pelargonic acid compounds, higher unsaturated fatty acids and nonionic surface active agents is employed in said medium as at least a partial replacement for the biotin.

13. The process of claim 7, wherein said nutrient medium contains at least 5 grams per deciliter of ammonium chloride.

* * * * *